United States Patent
Singer et al.

(10) Patent No.: US 6,267,314 B1
(45) Date of Patent: *Jul. 31, 2001

(54) BELT ROLLER WITH DAMPED FORCE LIMITER

(75) Inventors: Klaus-Peter Singer; Enno Witfeld, both of Hamburg; Günter Clute, Henstedt-Ulzburg, all of (DE)

(73) Assignee: Autoliv Development AB (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/378,123

(22) Filed: Aug. 19, 1999

Related U.S. Application Data

(63) Continuation of application No. 08/945,305, filed on Feb. 13, 1998, now Pat. No. 6,105,894.

(30) Foreign Application Priority Data

Apr. 14, 1995 (DE) ............................................. 195 14 114
Apr. 11, 1996 (WO) ................................... PCT/SE96/00472

(51) Int. Cl.[7] ............................................................ B60R 22/28
(52) U.S. Cl. ......................................................... 242/379.1
(58) Field of Search ........................ 42/379.1; 280/805, 280/806; 297/470, 471, 472

(56) References Cited

U.S. PATENT DOCUMENTS

| | | | |
|---|---|---|---|
| 4,322,046 | * | 3/1982 | Tanaka et al. ..................... 242/379.1 |
| 5,660,347 | * | 8/1997 | Baker ................................. 242/379.1 |
| 5,794,877 | * | 8/1998 | Ono et al. .......................... 242/379.1 |

FOREIGN PATENT DOCUMENTS

| | | | |
|---|---|---|---|
| 527076 | * | 8/1972 | (CH) . |
| 2727470 | * | 1/1979 | (DE) . |
| 4314883 | * | 11/1994 | (DE) . |
| 4331027 | * | 3/1995 | (DE) . |
| 19517440 | * | 11/1995 | (DE) . |

* cited by examiner

Primary Examiner—John M. Jillions
(74) Attorney, Agent, or Firm—Robert W. Becker & Associates

(57) ABSTRACT

A self-locking belt roller has a housing and a belt winding shaft rotatably mounted in housing. A torsion rod has a first end connected in the belt winding shaft. A profile head is connected to a second end of the torsion rod. A blocking member, that is vehicle-sensitive and/or belt-sensitive, is mounted on the profile head and moveable into a locking position at the housing in which rotation of the belt winding shaft is blocked. An energy-dissipating structure is positioned within a force transmission path, including the profile head, the torsion rod, and the belt winding shaft, for increasing a restraining force before the torsion rod becomes effective or simultaneously to the torsion rod becoming effective and for obtaining a degressive force characteristic curve.

14 Claims, 6 Drawing Sheets

FIG_3

BELT ROLLER WITH DAMPED FORCE LIMITER

This application is a continuation of Ser. No. 08/945,305, filed Feb. 13, 1998 and now U.S. Pat. No. 6,105,894, which was the National Stage of International Application No. PCT/SE96/00472, filed Apr. 11, 1996.

BACKGROUND OF THE INVENTION

The invention relates to a self-locking belt roller with a vehicle-sensitive and/or seat belt-sensitive controllable blocking device, the belt roller being provided with a force limiting device for restricted belt withdrawal when a blocking member is engaged, the force limiting device comprising a torsion rod which is connected on the one hand to the belt winding shaft and on the other hand to the blocking member.

A belt roller having the above features is described in connection with a tightening device in DE 43 31 027 A1; however, the tightening device is not necessary for the function of the force limiting device in the known belt roller. In the known belt roller, the force limiting device is constructed as a torsion rod, so that particularly when used in connection with an airbag, the response of the force limiting device allows for an additional, but decelerated forward displacement of the belted occupant. This is achieved in that, in the event of loading, as the belt unwinds from the belt winding shaft the belt loading of the belt winding shaft blocked by the blocking member is reduced by the torsional rod which yields and allows for further rotation of the belt winding shaft.

The disadvantage associated with the known belt roller is that the acting force is increased by the force limiting device as a result of the cold deformation of the material and the decreasing winding diameter, i.e. as a result of the associated lever arm reduction; the associated force-path characteristic curve is progressive. In this context, further tests have shown that it is, for example, desirable for a higher restraining force to be exerted by the force limiting device at the start of an accident, namely so long as the belted person is not in contact with the airbag, and only to allow a reduced restraining force to be exerted via the belt roller once both safety devices are effective.

It is therefore the object of the invention to use suitable measures to better adapt the force-path curve in a belt roller of the generic type to the special features of the deceleration curve of the vehicle or of the vehicle occupants.

SUMMARY OF THE INVENTION

The idea upon which the invention is based is that, for connecting the torsion rod to the blocking member, a profile head, which is connected to the associated shaft end face and rotates together with the belt winding shaft, is provided as a support for the radially deflectable blocking member, and in the force transmission path between the torsion rod, profile head and shaft an additional energy-dissipating structure is provided for increasing the restraining force prior to the torsion rod becoming effective and for obtaining a stepped and/or degressive force-path characteristic curve. The invention offers the advantage that, prior to the force limiting device constructed as a torsion rod becoming effective, the vehicle occupant still participates as a result of the increased restraining forces in the relatively low initial deceleration of the motor vehicle and later upon contact with the airbag a lower restraining force is exerted via the force limiting device. In this respect, it may be expedient to adjust the force-path characteristic curve so that it decreases in step fashion or is generally degressive. Thus, the path of the chest acceleration or of the HIC index, for example, can be optimized by a degressive force-path characteristic curve of the force limiting device as a function of the deformation behavior of a torsion rod.

In accordance with a first embodiment of the invention, the additional energy-dissipating structure is arranged between the belt winding shaft and the profile head, so that a relative movement between the belt winding shaft and the profile head is made possible by the uncoupling of the blocking member from the belt winding shaft. This relative movement can be exploited for the arrangement of the energy-dissipating structure. In this respect, the energy-dissipating structure according to a first embodiment of the invention is formed by a connection between the shaft end face and the profile head in the form of shearing journals, so that the initial loading is absorbed by the shearing journals and, after the destruction thereof, a reduced force level is adjusted as the torsion rod becomes effective. The arrangement can be adjusted in such a manner that the shearing journals shear off before the torsion rod becomes effective or overlap with the torsion rod.

Alternatively, projections may be provided on the profile head, which engage in corresponding recesses arranged in the belt winding shaft and deforming in the event of a movement of the belt winding shaft relative to the profile head.

According to a further embodiment of the invention, the energy-dissipating structure consists of a division of the torsion rod into two torsion elements, which are arranged one within the other, are connected in a positive-locking manner to one another, and are connected as usual on the one hand to the belt winding shaft and on the other hand to the profile head; the different design of the two torsion elements is selected in such a manner that one of the torsion elements fails at an earlier point in time than the other so that, after the failure of the first torsion element, only the second torsion element is effective.

According to embodiments of the invention, the torsion elements can be made of materials of different ductility, the inner torsion rod preferably being made of a less ductile material. Alternatively, the torsion elements can have different torsion lengths, the "torsion length" being the length of the smallest cross section of the torsion rod.

According to a further embodiment of the invention, in order to adjust an energy-dissipating structure, the torsion rod is constructed as a polygonal tube, whose profile constricts as it absorbs force, so that the polar moment of resistance and therefore carrying capacity of the torsion rod decreases.

In a further development of the invention, the torsion rod can be constructed as a rectangular element having a casing which surrounds the rectangular element and is made of a suitable plastics material. This design offers the advantage that the torsion rod can now be manufactured as a punched part, rather than as the usual turned part in the state of the art, the fitted plastics material casing forming an additional moment of resistance when the torsion rod is twisted, until the casing is blown off as a result of the changing shape within the casing as the torsion rod is twisted. In this context, it is expedient for the rectangular tube to comprise corresponding connection elements having a rectangular cross section at its two ends for the connection of the profile head and the belt winding shaft, and for the casing to extend between the connection elements.

According to an embodiment of the invention, it can be provided that the inner receiving aperture of the belt winding shaft corresponds in its cross section to the dimension of the casing of the torsion rod which can be pushed into the receiving aperture. This results in the following advantage: As the torsion rod is twisted, the plastics material casing fitted over the torsion rod is plastically deformed after being blown off the torsion rod, since the casing cannot escape in the receiving aperture of the belt winding shaft in which it is enclosed.

However, it is also provided in an embodiment of the invention that the torsion rod is constructed as a turned part having a round cross section and is provided with a casing made of a suitable plastics material which is fitted over the torsion rod, the moment of resistance in this embodiment essentially being generated by the friction or cohesion between the torsion rod and the casing.

Finally, it can be provided according to an embodiment of the invention that the belt winding shaft engages around the profile head with a recess and a bending bolt, which deforms when the belt winding shaft moves relative to the profile head, is arranged between the profile head and the belt winding shaft. In this respect, according to an embodiment of the invention, the profile head can comprise a flattened area over a circumferential section and the bending bolt, which is held at both ends against the belt winding shaft, can be arranged resting upon the flattened area in the recess of the belt winding shaft in its extended state. When a corresponding torque acts upon the belt winding shaft, the latter rotates relative to the profile head, which is held by the blocking member, the deformation of the bending bolt occurring over a large angular range, resulting in a longer period of energy dissipation, the torsion rod subsequently or simultaneously becoming effective as a force limiting device.

BRIEF DESCRIPTION OF THE DRAWINGS

Embodiments of the invention are described in further detail below and are illustrated in the drawings, in which.

DESCRIPTION OF PREFERRED EMBODIMENTS

Figure 1:
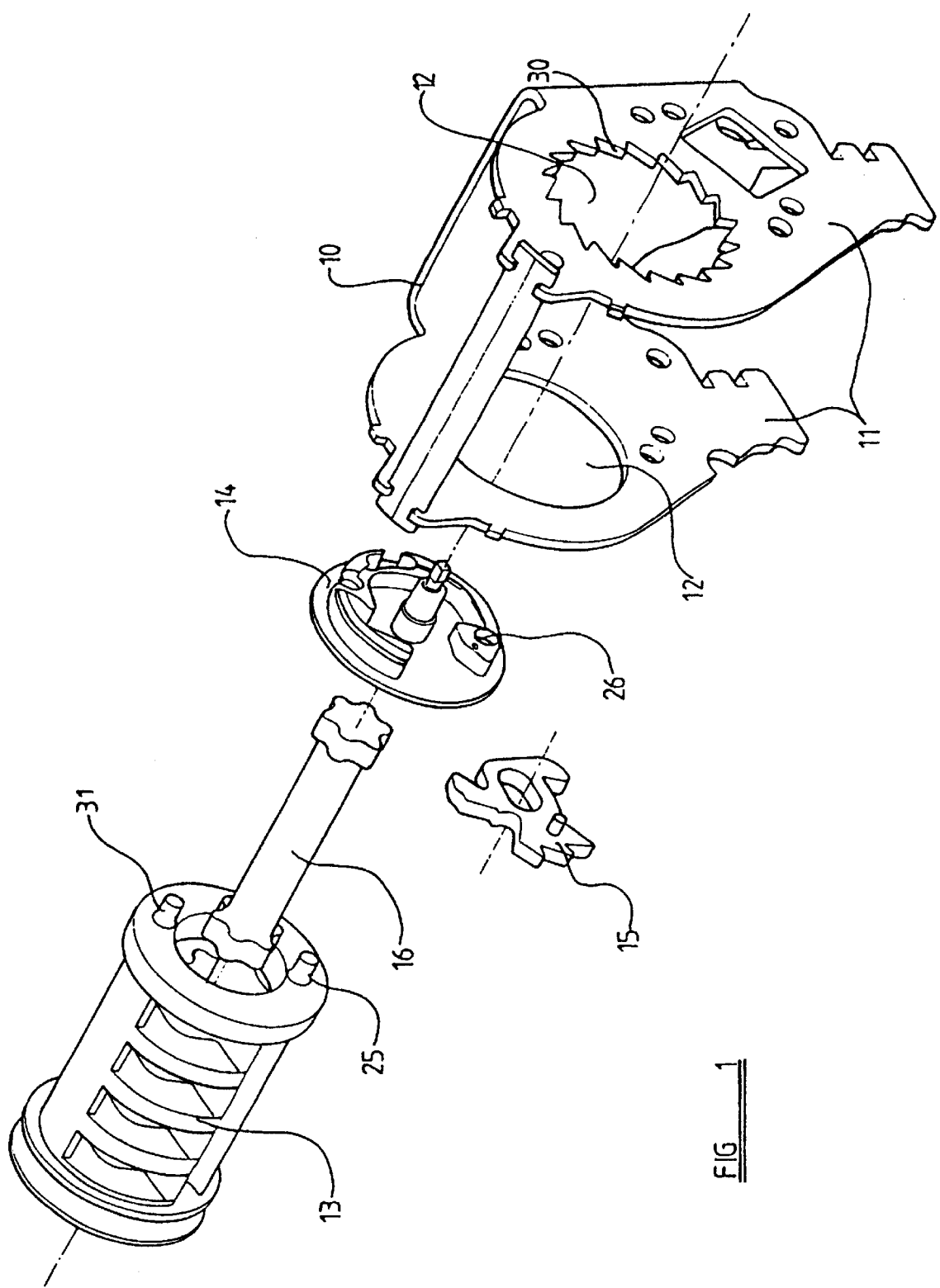
FIG. 1 is a schematic view of a belt roller.

As firstly shown in FIG. 1, the belt roller comprises a U-shaped housing 10, in whose U-limbs 11 or the apertures 12 arranged therein a belt winding shaft 13 is mounted. At the blocking end of the belt winding shaft 13, a profile head 14, which rotates within the U-limb 11 of the housing 10, is associated with the end face of the belt winding shaft 13. Mounted on the profile head 14 is a blocking member 15, which can be radially deflected under the action of a control device, not shown, and which is controlled so as to be guided into the toothing 25 arranged in the associated aperture 12 in the event of deceleration.

The profile head 14 and the belt winding shaft 13 are connected to one another by a torsion rod 16 acting as a force-limiting device, the connection being formed in that one end of the torsion rod 16 is connected preferably in a positive-locking manner to the profile head 14, and the other end of the torsion rod 16 extending in the belt winding shaft 13 is connected to the belt winding shaft 13 in a manner not shown. If, after the blocking of the profile head 14 by means of the blocking member 15, there is a further belt extraction with a corresponding rotation of the belt winding shaft 13, then this rotational movement is transmitted via the torsion rod 16 with a simultaneous absorption of energy to the profile head 14, either an abutment being provided between the belt winding shaft 13 and the profile head 14 to limit the deformation of the torsion rod 16 or the torsion rod being constructed in such a manner that it can carry out a larger number of rotations than is required for the energy conversion. In order to provide an additional, energy-dissipating structure in the force transmission path, at least one shearing element 25 is provided at the end face of the belt winding shaft 13 facing the profile head 14, which shearing element engages in an associated bore 26 in the profile head 14. By means of the cross sectional surface area of the shearing element and its distance from the pivot axis of the belt winding shaft 13 or profile head 14, it is possible to adjust a torque and path in such a manner that the shearing element shears off and thus the sole loading of the torsion rod 16 is effected. After the shearing off of the shearing element, the torque is exclusively transmitted by the torsion rod 16.

Figure 2:
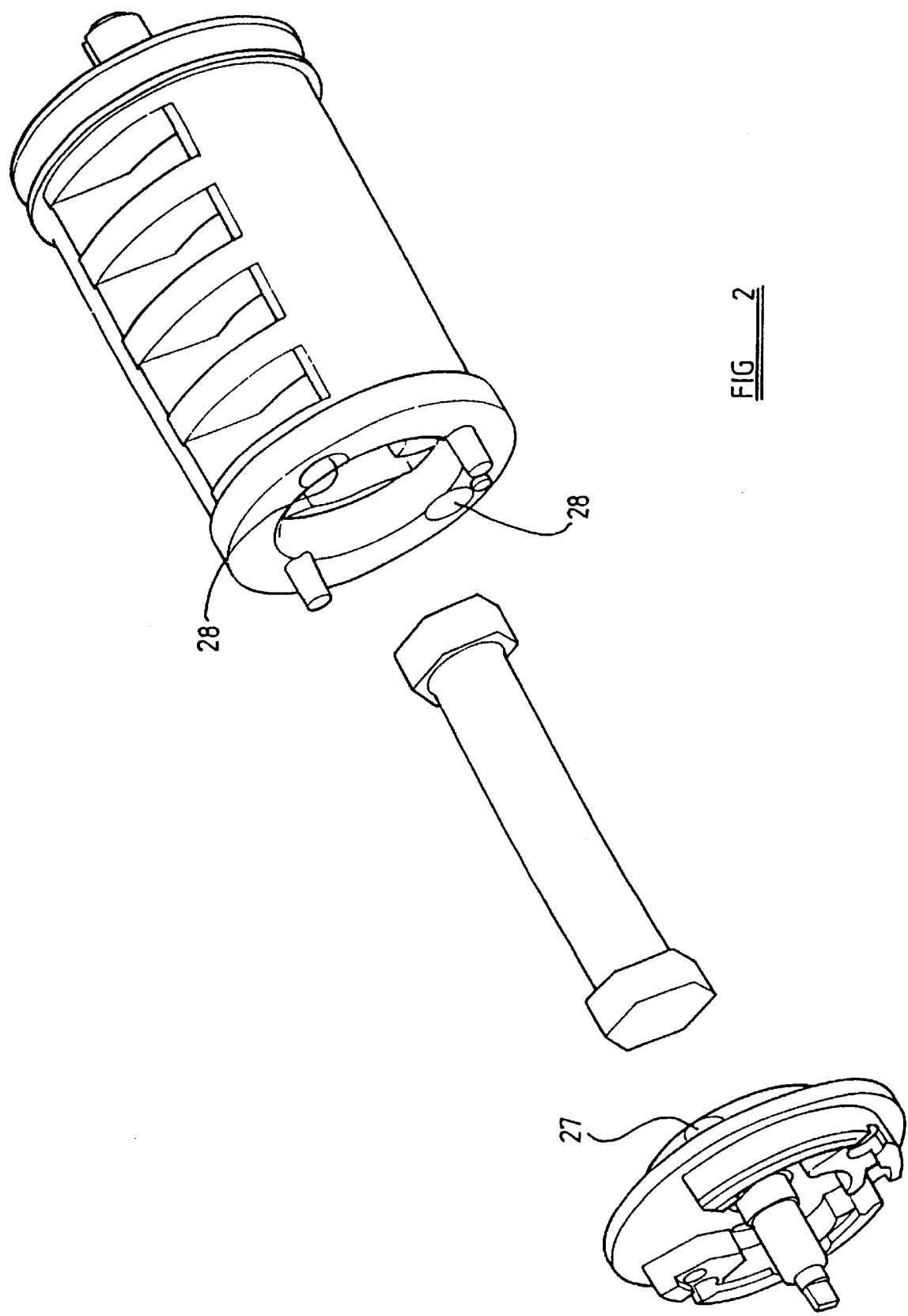
FIG. 2 is a schematic view of a shaft with torsion rod.

FIG. 2 illustrates an alternative embodiment, in which one or more projections 27 manufactured from a harder material are fitted in the profile head 14, the projections 27 engaging in recesses located on the associated end face of the belt winding shaft 13; these recesses are deformable, so that there is a corresponding energy dissipation from the start of loading.

Figure 3:
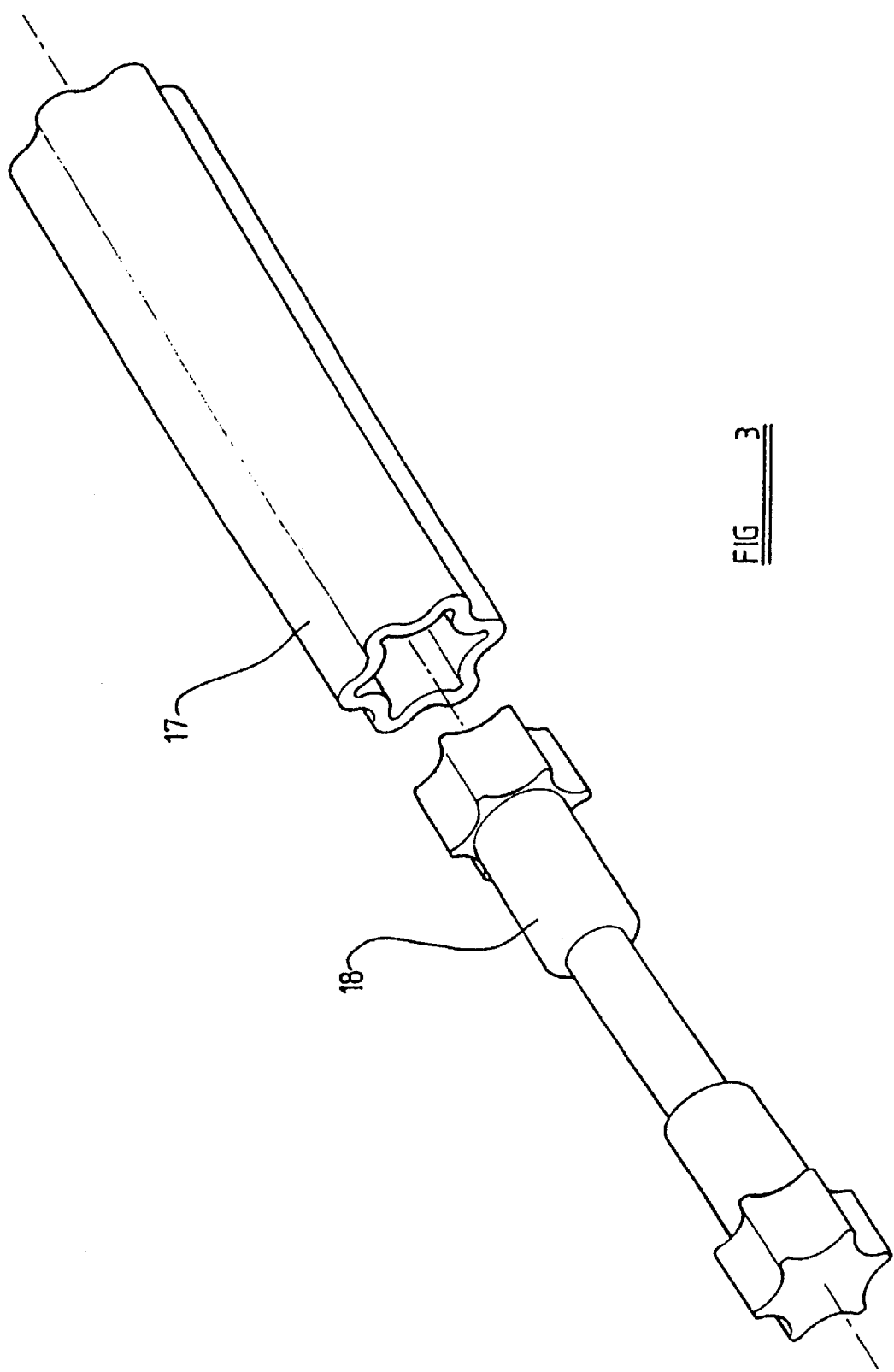
FIG. 3 is a detailed view of a torsion rod according to the invention.

FIG. 3 illustrates a further embodiment of the invention, in which the torsion rod 16 comprises an outer torsion element 17 and an inner torsion element 18 extending within the outer torsion element; the inner torsion element is manufactured from a less ductile material and/or has a shorter "torsion length", which is the length which applies to the smallest cross section of the torsion rod. As a result of this design, the inner torsion element fails before the outer torsion element and the further acting torque is then only transmitted by the outer torsion element 17. Corresponding force-path curves can be adjusted by the selection of material, diameter and torsion length of the inner torsion element 18.

A further alternative, not illustrated in the drawings, consists in constructing the torsion rod 16 as a polygonal tube—cf, for example, FIG. 3, position 17—, the profile constricting and the polar moment of resistance and therefore the carrying capacity of the torsion rod 16 decreasing during the plastic torsion of the torsion rod 16. In this manner, it is possible to adjust a corresponding force-path characteristic curve which is degressive from the start.

In accordance with the embodiment illustrated in FIGS. 4 to 7, the torsion rod is formed by a rectangular element 35, which is provided with an enclosing casing 32 made of a suitable plastics material. In this case the rectangular element 35 comprises at each of its two outer ends a connection element 33 having a rectangular cross section for the connection of the profile head 14 or belt winding shaft 13, respectively, the casing 32 extending between these connection elements 33. As shown in detail in FIG. 6, the edges 34 of the rectangular element 35 are rounded with a radius, so that a good connection between the rectangular element 35 and the casing 32 is provided.

Figure 4:
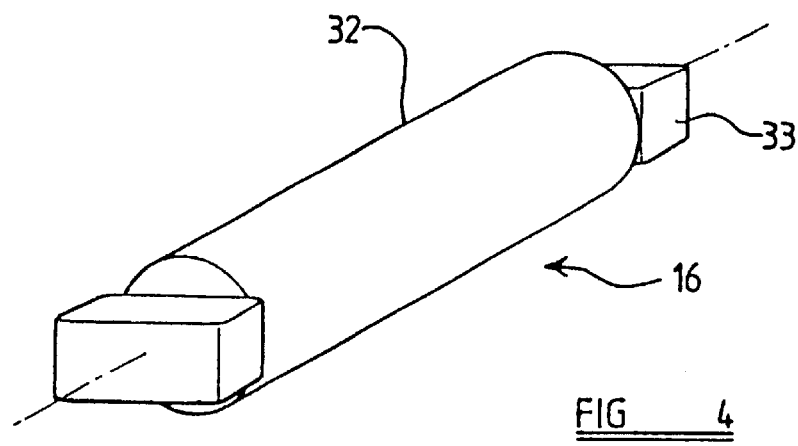
FIG. 4 shows a torsion rod constructed as a rectangular element with casing.
Figure 5:
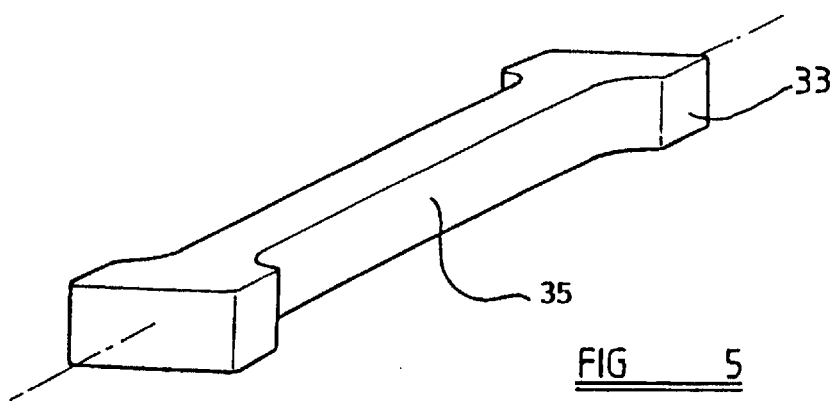
FIG. 5 shows the torsion rod according to FIG. 4 without casing.
Figure 6:
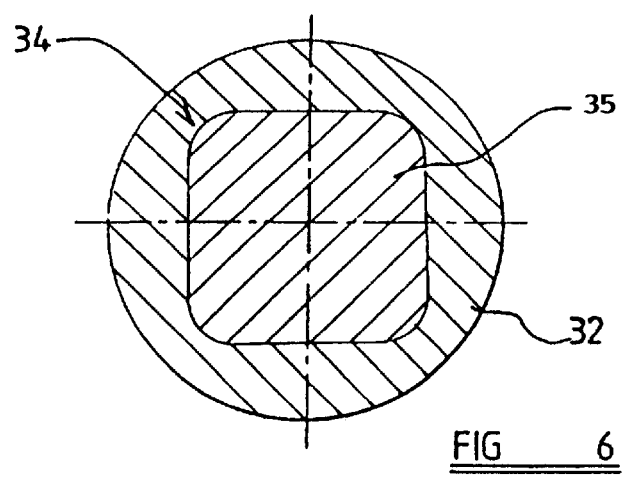
FIG. 6 is a cross section through the subject matter of FIG. 4.
Figure 7:
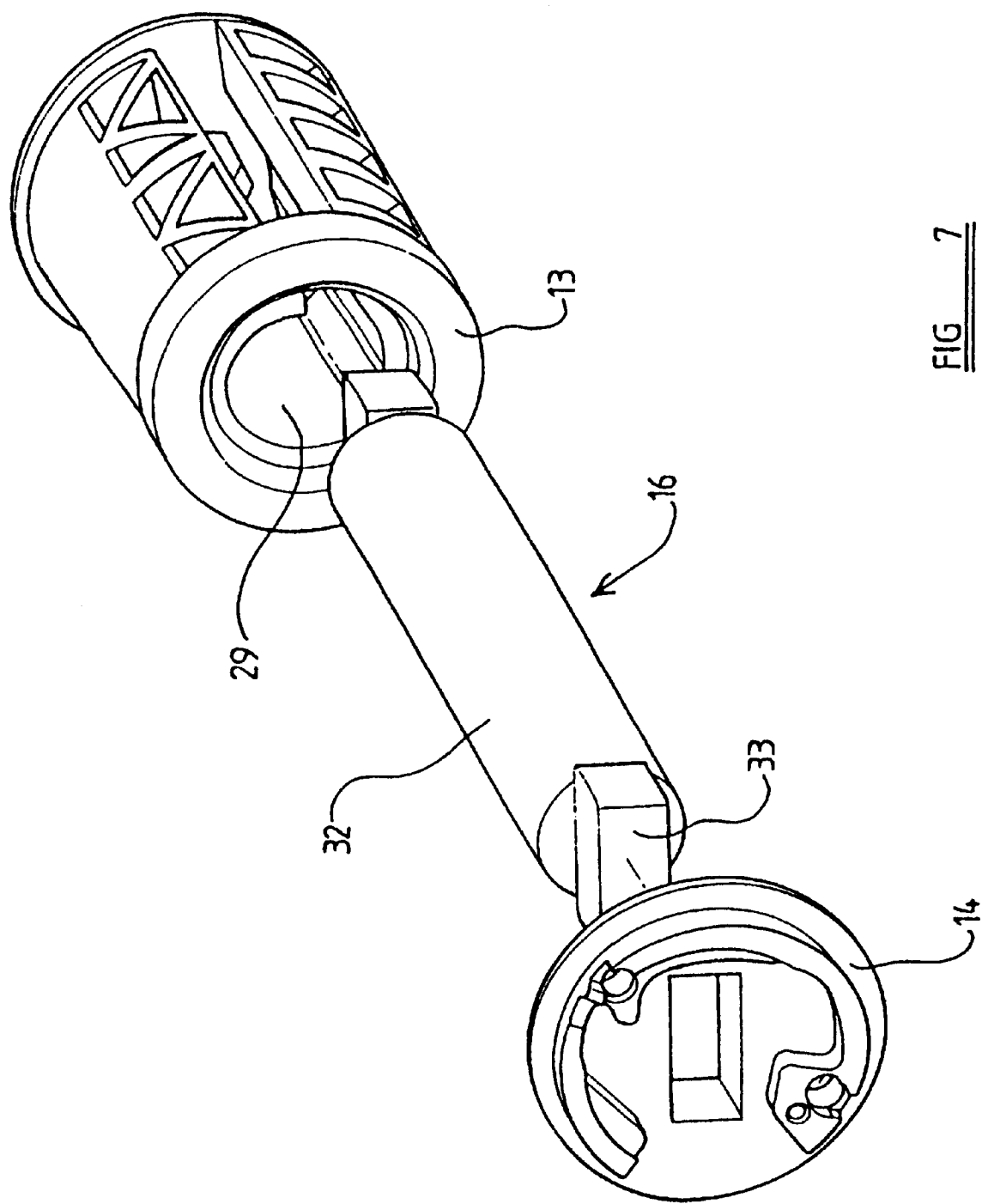
FIG. 7 is a schematic view of the belt winding shaft of the belt roller having a torsion rod according to FIG. 4.

If the embodiment of the torsion rod illustrated in FIGS. 4 to 6 is loaded in an assembly according to FIG. 1, then the positive locking between the rectangular element 35 and the plastics material casing 32 results in an increased moment of resistance, until the casing 32 is blown off by the changing form of the rectangular element 35. As shown in FIG. 7, this moment of resistance can be increased when the receiving aperture 29 located in the belt winding shaft 13 corresponds in its cross section to the dimension of the casing 32 of the torsion rod 16 which is to be pushed into the receiving aperture 29, which means that the plastics material casing cannot escape when it is blown off by the twisting of the rectangular element 35, but is plastically deformed. This means that a slower decline in the force-path curve can be adjusted. In this respect, the course of the force-path curve is more specifically also dependent upon the type of plastics material used, a softer plastics material resulting in a softer curve and a harder plastics material in a steeper curve during the rise and fall respectively of the force path.

Figure 8:
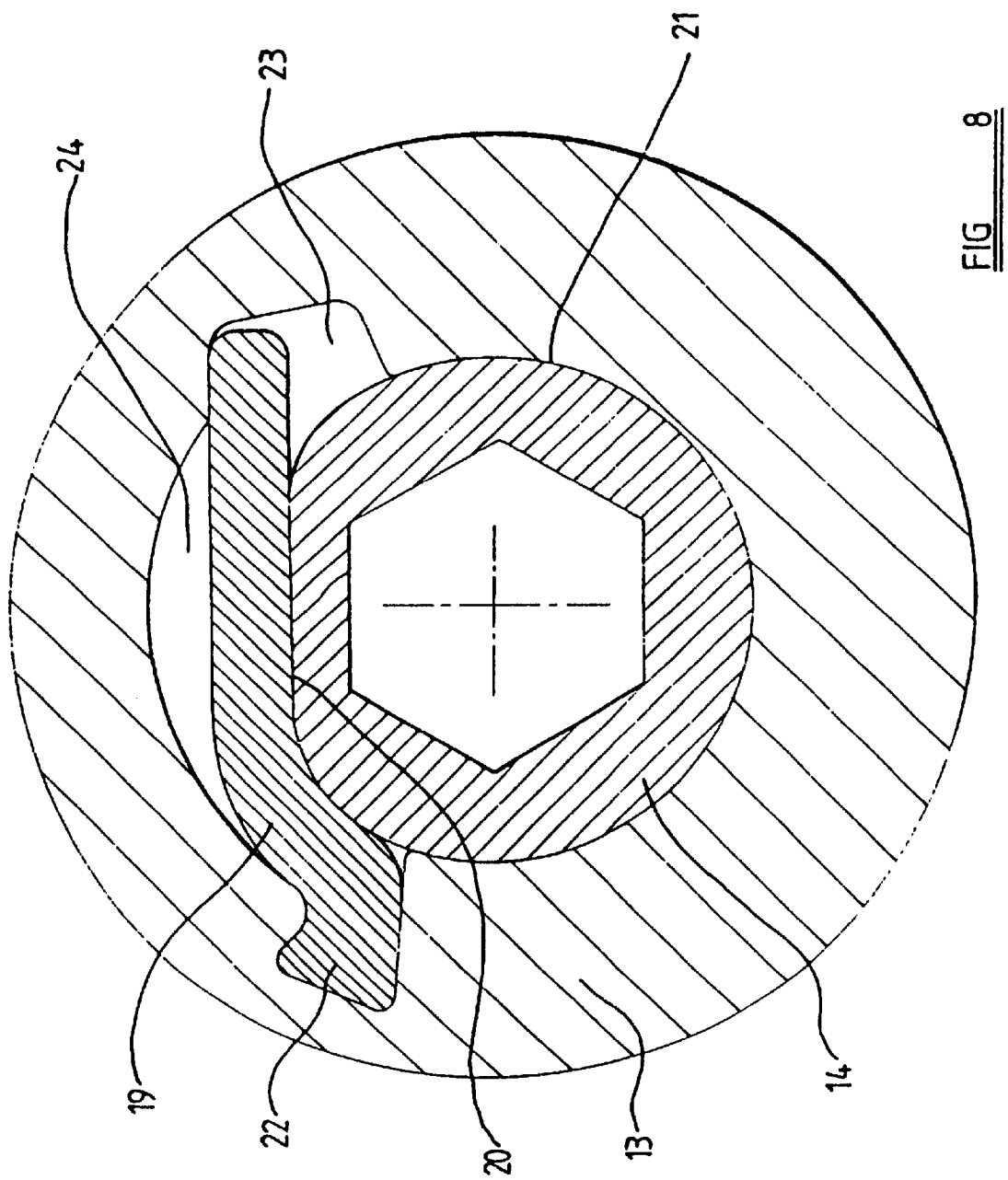
FIG. 8 is a sectional view of the connection between the belt winding shaft and the profile head.

Finally, FIG. 8 shows an embodiment in which the energy-dissipating structure is arranged between the belt winding shaft 13 and the profile head 14 in that the belt winding shaft 13 encloses the profile head 14 with a recess 21. In this case, the profile head 14 comprises a flattened area 20 over a circumferential section, the recess 21 of the belt winding shaft 13 rising above the flattened area 20 with an additional clearance 24. In its extended position, a bending bolt 19 is arranged so as to rest upon the flattened area 20 of the profile head 14. The bending bolt 19 is secured at one end with a positive-locking connection 22 to the belt winding shaft 13, whilst the other end of the bending bolt 19 arranged in its extended position lies in a recess 23 in the belt winding shaft 13. When this connection is correspondingly loaded, as a result of the rotation of the belt winding shaft 13 relative to the profile head 14 which is held by the blocking member 15, the bending bolt 19 is deformed over the angular range provided by the flattened area in that the bending bolt is pressed into the contour of the clearance 24 of the recess 21, the associated end of the bending bolt finding the required escape space in the recess 23. After a corresponding deformation of the bending bolt 19, the level of force acting upon the torsion rod is reduced.

The features of the subject matter of this document disclosed in the above description, the patent claims, the abstract and the drawings can form the basis, either individually or in any combination, for the realization of the invention in its different embodiments.

What is claimed is:

1. A self-locking belt roller comprising:
   a housing:
   a belt winding shaft rotatably mounted in said housing;
   a torsion rod having a first end connected in said belt winding shaft;
   a profile head connected to a second end of said torsion rod;
   a blocking member, that is vehicle-sensitive or belt-sensitive or vehicle- and belt-sensitive, mounted on said profile head and moveable into a locking position at said housing in which rotation of said belt winding shaft is blocked;
   an energy-dissipating structure positioned within a force transmission path, including said profile head, said torsion rod, and said belt winding shaft, for increasing a restraining force simultaneously to said torsion rod becoming effective and for obtaining a degressive force characteristic curve.

2. A belt roller according to claim 1, wherein said energy dissipating structure is connected to said belt winding shaft and said profile head.

3. A belt roller according to claim 2, wherein said energy dissipating structure comprises at least one shearing journal connected to said belt winding shaft and wherein said profile head has at least one bore in which said at least one shearing journal is positioned.

4. A belt roller according to claim 2, wherein said energy dissipating structure comprises at least one projection connected to said profile head and wherein said belt winding shaft has at least one recess in which said at least one projection is positioned, wherein said at least one recess deforms when said belt winding shaft rotates relative to said profile head.

5. A belt roller according to claim 1, wherein said torsion rod comprises a first and a second torsion elements, wherein said first torsion element is positive-lockingly mounted inside said second torsion element.

6. A belt roller according to claim 5, wherein said first and second torsion elements are made of materials of different ductility.

7. A belt roller according to claim 5, wherein said first torsion element has a different length than said second torsion element.

8. A belt roller according to claim 1, wherein said torsion rod is a tube of polygonal cross-section.

9. A belt roller according to claim 1, wherein said torsion rod is comprised of a rectangular element and a plastic casing surrounding said rectangular element.

10. A belt roller according to claim 9, wherein:
    said rectangular element has a first end with a first connection element and a second end with a second connection element;
    said casing extends from said first connection element to said second connection element;
    aid first and second connection elements have a rectangular cross-section;
    said first connection element connects said rectangular element to said profile head; and
    said second connection element connects said rectangular element to said belt winding shaft.

11. A belt roller according to claim 10, wherein said belt winding shaft has a receiving aperture having a cross-section matching a cross-section of said casing, wherein said casing is received in said receiving aperture.

12. A belt roller according to claim 1, wherein said torsion rod is comprised of a turned part having a round cross-section and a casing enclosing said turned part.

13. A belt roller according to claim 1, wherein said belt winding shaft has a recess in which said profile head is received, wherein said energy-dissipating structure is a bending bolt that rests at said profile head and engages said recess, wherein aid bending bolt deforms when said belt winding shaft moves relative to said profile head.

14. A belt roller according to claim 13, wherein said profile head has a flattened area over a circumferential portion thereof and wherein said bending bolt has two ends engaging said recess of said belt winding shaft and rests in a rest position thereof at said flattened area of said profile head.

* * * * *